Figure 1:
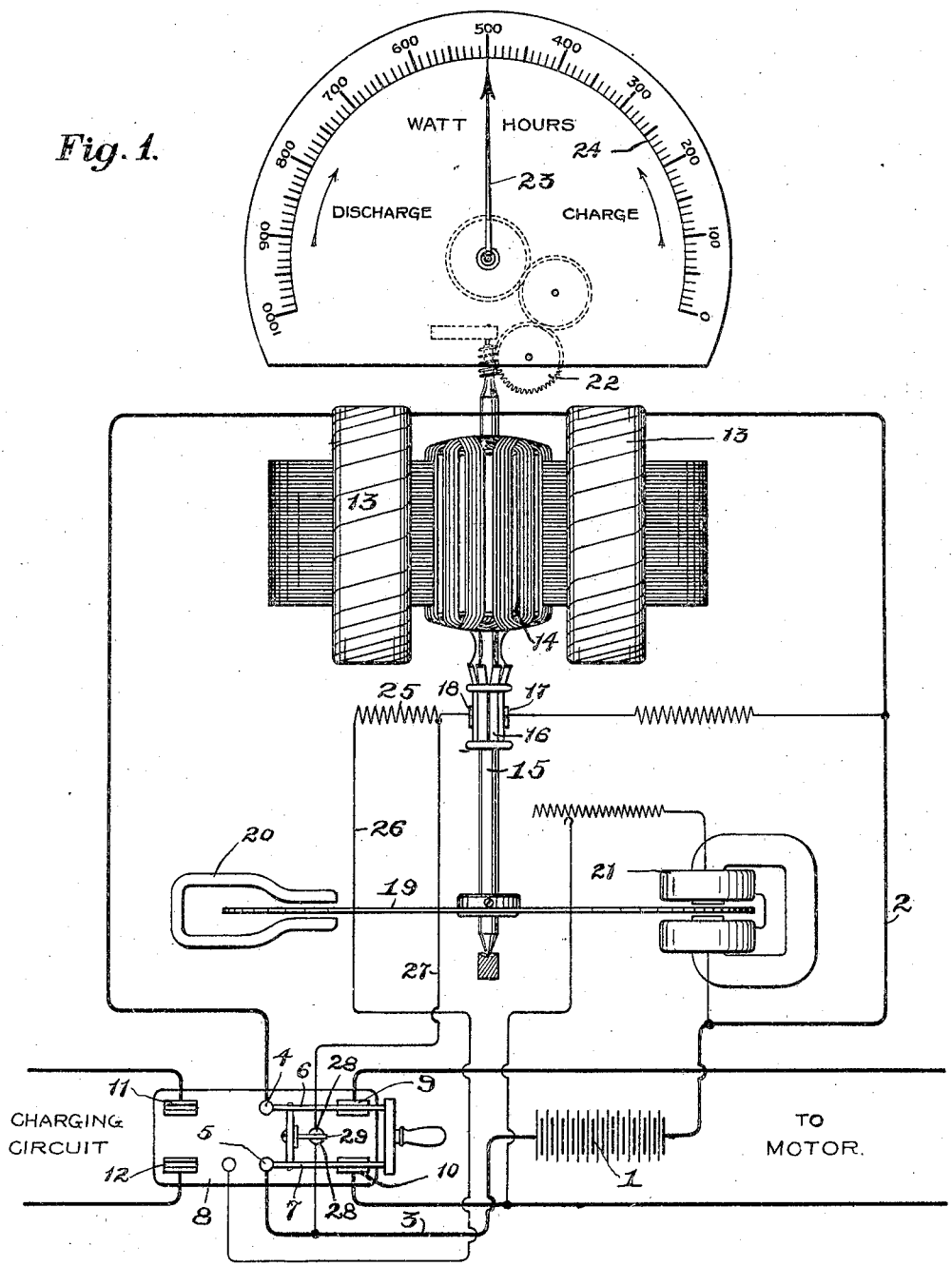

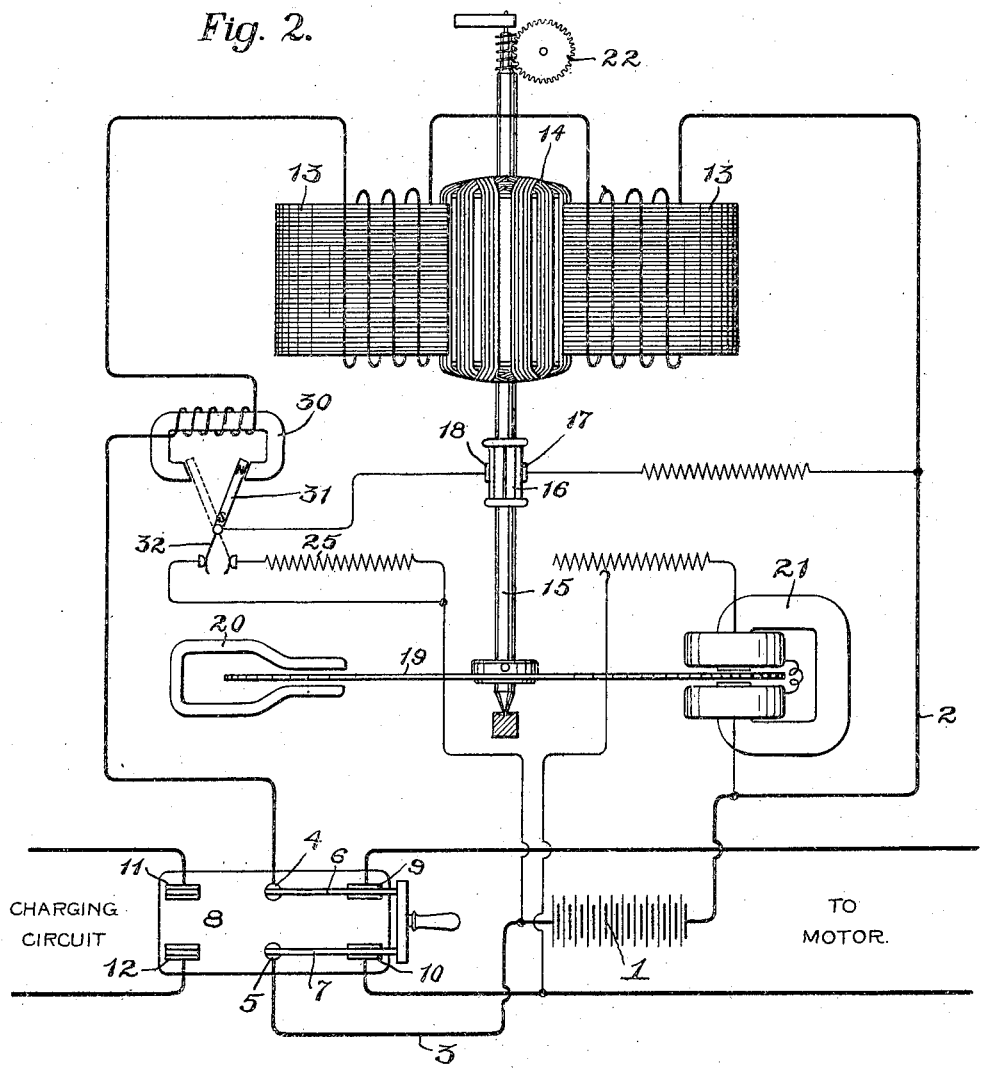

No. 769,989. Patented September 13, 1904.

UNITED STATES PATENT OFFICE.

THOMAS DUNCAN, OF CHICAGO, ILLINOIS.

ELECTRICAL MEASURING INSTRUMENT.

SPECIFICATION forming part of Letters Patent No. 769,989, dated September 13, 1904.

Application filed August 26, 1901. Serial No. 73,324. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to storage-battery meters, and has for its object the provision of improved means for modifying the torque of the meter to compensate for battery loss.

In my present invention I provide means for automatically increasing the rate of operation of the meter per unit of load or energy as the potential in the battery decreases, for which purpose I preferably employ a damping-disk for the meter arranged within the field of an electromagnet whose energizing-winding is subject to the pressure of the battery. This electromagnet is designed to exert its greatest braking effect upon the rotating element of the meter when the battery has been fully charged, this braking effect decreasing as the battery discharges. This electromagnet is preferably only associated with a storage battery, it being excluded from circuit when the switch controlling the association of the battery with the translating means and the charging-machine is thrown to connect the charging-machine with the battery.

I will explain my invention more fully by reference to the accompanying drawings, in which—

Figure 1 illustrates a storage battery, a main circuit-changing switch for controlling the association of the storage battery with its translating means or the charging-machine, and a meter in combination with the improved means of my invention for controlling the rate of operation thereof per unit of load or energy. Fig. 2 is a view similar to Fig. 1, the reading-dial and measuring-index being removed, while another form of circuit-changing switch is illustrated for controlling the association of the starting torque and braking-electromagnet with the meter.

Like parts are indicated by similar characters of reference in both views.

The storage battery 1 is provided with mains 2 and 3, terminating in the pivotal mountings 4 and 5, that support the blades 6 and 7 of a switch 8, the switch-blades 6 and 7 constituting the terminals of the storage battery. Contacts or jaws 9 and 10 constitute terminals of the conductors leading to the translating means, as the motor of a motor-vehicle, while contacts 11 and 12 constitute the terminals of circuit-conductors leading to the charging-machine. When the switch 8 is thrown to the left, the storage battery is connected in circuit with the charging-machine, and when the said switch is thrown to the right the storage battery is connected in circuit with the translating means.

The main 2 includes the current-winding of the meter, subdivided into current-coils 13 13. The rotating element of the meter is provided with an armature 14, mounted upon a spindle 15, which spindle carries a commutator 16, engaging brushes 17 18, that serve to include the armature of the meter in bridge of the storage-battery leads. A damping-disk 19 is provided upon the lower end of the armature-shaft and is arranged within the fields of a permanent magnet 20 and an electromagnet 21, the latter being removably associated with the damping-disk. The winding of the electromagnet 21 is included in bridge between the storage-battery mains to have the pressure of the battery impressed thereupon. When the battery has been freshly charged, the pressure is at its highest point, this pressure decreasing as the battery discharges. As the pressure decreases the current through the electromagnet 21 weakens, thereby reducing the load imposed by the electromagnet upon the rotating element of the meter, which rotating element (the shaft, with its associated parts) is adapted to actuate the wheels of a counting-train 22, that serve to move the index-needle 23 in a clockwise direction over a scale 24 while the battery is discharging and in a contra-clockwise direction while the battery is being charged. In this manner the rate of operation of the rotating element per unit of load or energy is gradually increased as the storage battery discharges, whereby compensation is effected for battery loss. When the charging-machine is connected with the storage battery, the electromagnet 21 is cut out of circuit, thereby removing the load from the instrument. If some means were not provided for compensating for the removed load, the meter would operate at too rapid a rate while the battery is being charged. I therefore provide means for maintaining the proper rate of operation per unit of load or energy of the meter while the battery is being charged, for which purpose a resistance 25 may be included in series with the armature only when the battery is being charged to thereby decrease the torque of the meter. In Fig. 1 there is shown a conductor 26 permanently connected with the resistance 25, switching apparatus being provided, such that when the battery is in connection with the charging-machine the said resistance is included in series with the armature. In the system illustrated in Fig. 1 in order to remove the resistance 25 or counteract its effects, so that the torque of the instrument may be increased to compensate for the load placed upon the meter by the magnet 21, a shunt-conductor 27 is illustrated, that includes in its circuit two contacts 28 28, that are electrically connected by a supplemental switch-blade 29 when the switch 8 is thrown toward the right to connect the battery with the translating means, whereby a complete shunt is established about the resistance. To accomplish this result in the system illustrated in Fig. 2, I have employed an electromagnet 30, whose winding is included in series with the main field-winding of the meter, the armature 31 of the electromagnet being polarized and carrying a circuit-changing-switch portion 32. With the adjustment of the switch 8 (shown in Fig. 2) current is passed through the helix of the electromagnet 30 in such a direction as to cause the armature 31 to be swung in a clockwise direction to the position indicated in full lines. The switch 31 is connected with the commutator-brush 18, and when in the position shown cuts the resistance 25 out of circuit. When the switch 8 is thrown to the alternative position to connect the storage battery in circuit with the charging-machine, the direction of current through the winding of magnet 30 is reversed, causing the armature 31 to assume the position illustrated by the dotted lines, in which adjustment of the armature the resistance 25 is cut into circuit with the meter-armature. It will be observed that in each of the systems illustrated one terminal of the magnet 21 is connected with one of the mains leading to the translating means, so that when the switch 8 is operated to disconnect the storage battery from the translating means the said magnet-winding is excluded from circuit.

While I have herein shown and particularly described the preferred embodiment of my invention, it is evident that changes may be made without departing from the spirit thereof, and I do not wish, therefore, to be limited to the precise disclosure herewith set forth; but,

Having thus described my invention, I claim as new and desire to secure by Letters Patent—

1. The combination with a storage battery, of a switch for changing the connection of the storage battery from the translating means to be supplied thereby to the charging-machine and vice versa, a meter receiving current passing through the storage battery, and means for gradually effecting an increase in the rate of operation of the meter per unit of load or energy as the battery discharges to compensate for battery loss, substantially as described.

2. The combination with a storage battery, of a switch for changing the connection of the storage battery from the translating means to be supplied thereby to the charging-machine and vice versa, a meter receiving current passing through the storage battery, means for gradually effecting an increase in the rate of operation of the meter per unit of load or energy as the battery discharges to compensate for battery loss, and means for counteracting the aforesaid means while the battery is connected with the charging-machine or source of current, substantially as described.

3. The combination with a storage battery, of a switch for changing the connection of the storage battery from the translating means to be supplied thereby to the charging-machine and vice versa, a meter receiving current passing through the storage battery, means for gradually effecting an increase in the rate of operation of the meter per unit of load or energy as the battery discharges to compensate for battery loss, means for counteracting the aforesaid means while the battery is connected with the charging-machine or source of current, and controlling means for dissociating one or the other of the aforesaid means from the meter, according to the connection of the battery with the translating means or charging-machine, substantially as described.

4. The combination with a storage battery, of a switch for changing the connection of the storage battery from the translating means to be supplied thereby to the charging-machine and vice versa, a meter receiving current passing through the storage battery, and means for placing upon the meter a gradually-reduced load while the battery is discharging to compensate for battery loss, substantially as described.

5. The combination with a storage battery, of a switch for changing the connection of the storage battery from the translating means to be supplied thereby to the charging-machine and vice versa, a meter receiving current passing through the storage battery, means for placing upon the meter a gradually-reduced load while the battery is discharging to compensate for battery loss, and means for modifying the torque of the meter while the battery is being charged, substantially as described.

6. The combination with a storage battery, of a switch for changing the connection of the storage battery from the translating means to be supplied thereby to the charging-machine and vice versa, a meter receiving current passing through the storage battery, means for placing upon the meter a gradually-reduced load while the battery is discharging to compensate for battery loss, means for modifying the torque of the meter while the battery is being charged, and controlling means whereby the variable-load-producing means is rendered ineffective and the torque-modifying means is rendered effective when the storage battery is being charged, and for rendering the torque-modifying means ineffective and the load-varying means effective while the battery is being discharged, substantially as described.

7. The combination with a storage battery, of a switch for changing the connection of the storage battery from the translating means to be supplied thereby to the charging-machine and vice versa, a meter receiving current passing through the storage battery, a damping-disk for the meter, and an electromagnet within whose field the damping-disk is arranged, the winding of the electromagnet being included during discharge in bridge of the battery to be subject to its potential, substantially as described.

8. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, and a switch for changing the connection of the storage battery from the translating means to be supplied thereby to the charging-machine and vice versa, said switch also serving to disconnect the said electromagnet or render the same ineffective when the storage battery is being charged, substantially as described.

9. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, a switch for changing the connection of the storage battery from the translating means to be supplied thereby to the charging-machine and vice versa, said switch also serving to disconnect the said electromagnet or render the same ineffective when the said storage battery is being charged, and means for counteracting the effect of the removed load when the battery is being charged, substantially as described.

10. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, a switch for changing the connection of the storage battery from the translating means to be supplied thereby to the charging-machine and vice versa, said switch also serving to disconnect the said electromagnet or render the same ineffective when the storage battery is being charged, and a torque-reducing means brought into operation when the storage battery is being charged to counteract the effect of the removed load, substantially as described.

11. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, a switch for changing the connection of the storage battery from the translating means to be supplied thereby to the charging-machine, and vice versa, said switch also serving to disconnect the said electromagnet or render the same ineffective when the storage battery is being charged, and a torque-reducing resistance brought into circuit with the pressure-winding of the meter when the battery is being charged to compensate for the removed load, substantially as described.

12. The combination with a storage battery, of a meter receiving current passing through the storage battery, means for gradually effecting an increase in rate of operation of the meter per unit of load or energy as the battery discharges to compensate for battery loss, and means for counteracting the aforesaid means while the battery is connected with the charging-machine or source of current, substantially as described.

13. The combination with a storage battery, of a meter receiving current passing through the storage battery, means for gradually effecting an increase in the rate of operation in the meter per unit of load or energy as the battery discharges to compensate for battery loss, means for counteracting the aforesaid means while the battery is connected with the charging-machine or source of current, and controlling means for dissociating one or the other of the aforesaid means from the meter, according to the connection of the battery with the translating means or charging-machine, substantially as described.

14. The combination with a storage battery, of a meter receiving current passing through the storage battery, and means for placing upon the meter a gradually-reduced load while the battery is discharging to compensate for battery loss, substantially as described.

15. The combination with a storage battery, of a meter receiving current passing through the storage battery, means for placing upon the meter a gradually-reduced load while the battery is discharging to compensate for battery loss, and means for modifying the torque of the meter while the battery is being charged, substantially as described.

16. The combination with a storage battery, of a meter receiving current passing through the storage battery, means for placing upon the meter a gradually-reduced load while the battery is discharging to compensate for battery loss, means for modifying the torque of the meter while the battery is being charged, and controlling means whereby the variable-load-producing means is rendered ineffective and the torque-modifying means is rendered effective when the storage battery is being charged, and for rendering the torque-modifying means ineffective and the load-varying means effective while the battery is being discharged, substantially as described.

17. The combination with a storage battery, of a meter receiving current passing through the storage battery, a damping-disk for the meter, and an electromagnet within whose field the damping-disk is arranged, the winding of the electromagnet being included during discharge in bridge of the battery to be subject to its potential, substantially as described.

18. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, and means for disconnecting the said electromagnet or rendering the same ineffective when the storage battery is being charged, substantially as described.

19. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, means for disconnecting the said electromagnet or rendering the same ineffective when the storage battery is being charged, and means for counteracting the effect of the removed load when the battery is being charged, substantially as described.

20. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, means for disconnecting the said electromagnet or rendering the same ineffective when the storage battery is being charged, and a torque-reducing means brought into operation when the storage battery is being charged to counteract the effect of the removed load, substantially as described.

21. The combination with a storage battery, of a meter receiving current passing through the storage battery, a damping-disk for the meter, an electromagnet within whose field the damping-disk is arranged, the winding of the electromagnet being included during discharge in bridge of the battery to be subject to its potential, means for disconnecting the said electromagnet or rendering the same ineffective when the storage battery is being charged, and a torque-reducing resistance brought into circuit with the pressure-winding of the meter when the battery is being charged to compensate for the removed load, substantially as described.

22. The combination with a storage battery, of a meter receiving current passing through the storage battery, and means for gradually effecting an increase in the rate of operation of the meter per unit of load or energy as the battery discharges, substantially as described.

23. The combination with a storage battery, of a meter receiving current passing through the storage battery, means for gradually effecting an increase in the rate of operation of the meter per unit of load or energy, and means for counteracting the aforesaid means while the battery is connected with the charging-machine or source of current, substantially as described.

In witness whereof I hereunto subscribe my name this 16th day of August, A. D. 1901.

THOMAS DUNCAN.

Witnesses:
GEORGE L. CRAGG,
HERBERT F. OBERGFELL.